US012769766B1

(12) United States Patent
Cui et al.

(10) Patent No.: US 12,769,766 B1
(45) Date of Patent: Oct. 20, 2026

(54) PROMPT OPTIMIZATION FOR GENERATIVE MACHINE LEARNING MODELS

(71) Applicant: INTUIT INC., Mountain View, CA (US)

(72) Inventors: Wendi Cui, Jersey City, NJ (US); Neo Yuchen, Arcadia, CA (US); Damien J. Lopez, Mountain View, CA (US); Palak Samel, San Diego, CA (US); Joel Atwood, San Diego, CA (US)

(73) Assignee: INTUIT INC., Mountain View, CA (US)

( * ) Notice: Subject to any disclaimer, the term of this patent is extended or adjusted under 35 U.S.C. 154(b) by 0 days.

(21) Appl. No.: 19/629,143

(22) Filed: Mar. 26, 2026

(51) Int. Cl.
*G06F 16/332* (2025.01)

(52) U.S. Cl.
CPC ................................ *G06F 16/3326* (2019.01)

(58) Field of Classification Search
CPC .................................................. G06F 16/3326
See application file for complete search history.

(56) References Cited

U.S. PATENT DOCUMENTS

| | | | | |
|---|---|---|---|---|
| 11,886,826 | B1 * | 1/2024 | Bavarian | G06F 40/253 |
| 2025/0061291 | A1 * | 2/2025 | Gardner | G06F 16/345 |

* cited by examiner

*Primary Examiner* — Apu M Mofiz
*Assistant Examiner* — Oscar Wehovz
(74) *Attorney, Agent, or Firm* — Patterson + Sheridan, LLP

(57) ABSTRACT

Aspects of the present disclosure involve prompt optimization for language processing machine learning models. Candidate prompts are evaluated on a task dataset by providing each candidate prompt to a language processing machine learning model to produce outputs and scoring the outputs to obtain fitness scores. A lowest-fitness candidate prompt is identified, and a predator vector is injected into a set of predator vectors based on a prompt embedding of the lowest-fitness candidate prompt. For a given candidate prompt a target embedding is computed based on applying a repulsion term away from the predator vectors. Edited prompts are generated using discrete textual edits, and an edited prompt having an embedding closest to the target embedding is selected as an updated candidate prompt. An output is generated using the language model based on the updated candidate prompt.

20 Claims, 5 Drawing Sheets

PROMPT OPTIMIZATION FOR GENERATIVE MACHINE LEARNING MODELS

INTRODUCTION

Aspects of the present disclosure relate to systems and methods that optimize natural-language prompts for language processing machine learning models by iteratively evaluating candidate prompts on a task dataset, guiding discrete prompt edits using an embedding-space target influenced by attraction toward high-fitness prompts and repulsion from predator vectors derived from low-fitness prompts, thereby improving task accuracy while mitigating convergence to local optima.

BACKGROUND

Language processing machine learning models, such as large language models (LLMs), are often controlled through prompts. In many practical deployments, relatively small changes in prompt wording, ordering of instructions, or inclusion of examples can materially affect output accuracy and consistency for a given task. As a result, selecting a prompt for use in production systems may require iterative experimentation to achieve acceptable performance.

Conventional approaches to prompt selection may rely on heuristic refinement, manual trial and error, or limited automated search. Heuristic approaches may generalize poorly across different tasks, datasets, and model versions. Manual trial and error approaches can be time-consuming and can depend heavily on the experience of the prompt author. In some settings, evaluation of candidate prompts requires repeated model invocations over a task dataset, which can be computationally expensive and can constrain the number of candidates that can be tested within available budgets.

Some automated prompt optimization techniques explore candidate prompts using randomized edits, evolutionary search, or other gradient-free procedures. However, these approaches may converge prematurely, for example by repeatedly selecting minor variations of a locally high-performing prompt while failing to sufficiently explore alternative semantic regions that may yield higher task performance. Furthermore, because prompts are generally discrete natural-language artifacts, optimization methods that operate in continuous latent or embedding spaces can be difficult to apply directly, as continuous updates may not correspond to valid or interpretable prompt text and may not be reliably converted back into natural-language prompts. Accordingly, there remains a need for improved techniques for automatically evaluating and refining prompts for language processing machine learning models.

BRIEF SUMMARY

According to an aspect of the present disclosure, a method for machine learning model prompt optimization is provided. The method may include: generating, for each candidate prompt in a set of candidate prompts, a corresponding fitness score based on using a language processing machine learning model conditioned on the candidate prompt to produce task outputs and evaluating the task outputs; computing, for a given candidate prompt in the set of candidate prompts, based on the corresponding fitness scores of the set of candidate prompts, a target embedding based on applying a repulsion term away from a set of predator vectors comprising a predator vector that is based on a lowest-fitness candidate prompt in the set of candidate prompts; generating a set of edited prompts from the given candidate prompt using discrete textual edits; selecting, as an updated candidate prompt for the given candidate prompt, an edited prompt from the set of edited prompts based on the target embedding; and generating an output using the language processing machine learning model based on the updated candidate prompt.

According to other aspects, a non-transitory computer readable medium may store instructions that, when executed by one or more processors of a computing system, cause the computing system to perform one or more of the methods set forth above. According to other aspects, a system includes one or more processors and a memory storing instructions that, when executed by the one or more processors, cause the system to perform aspects of one or more of the methods set forth above.

The following description and the related drawings set forth in detail certain illustrative features of one or more embodiments.

BRIEF DESCRIPTION OF THE DRAWINGS

The appended figures depict certain aspects of the one or more embodiments and are therefore not to be considered limiting of the scope of this disclosure.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Figure 1:
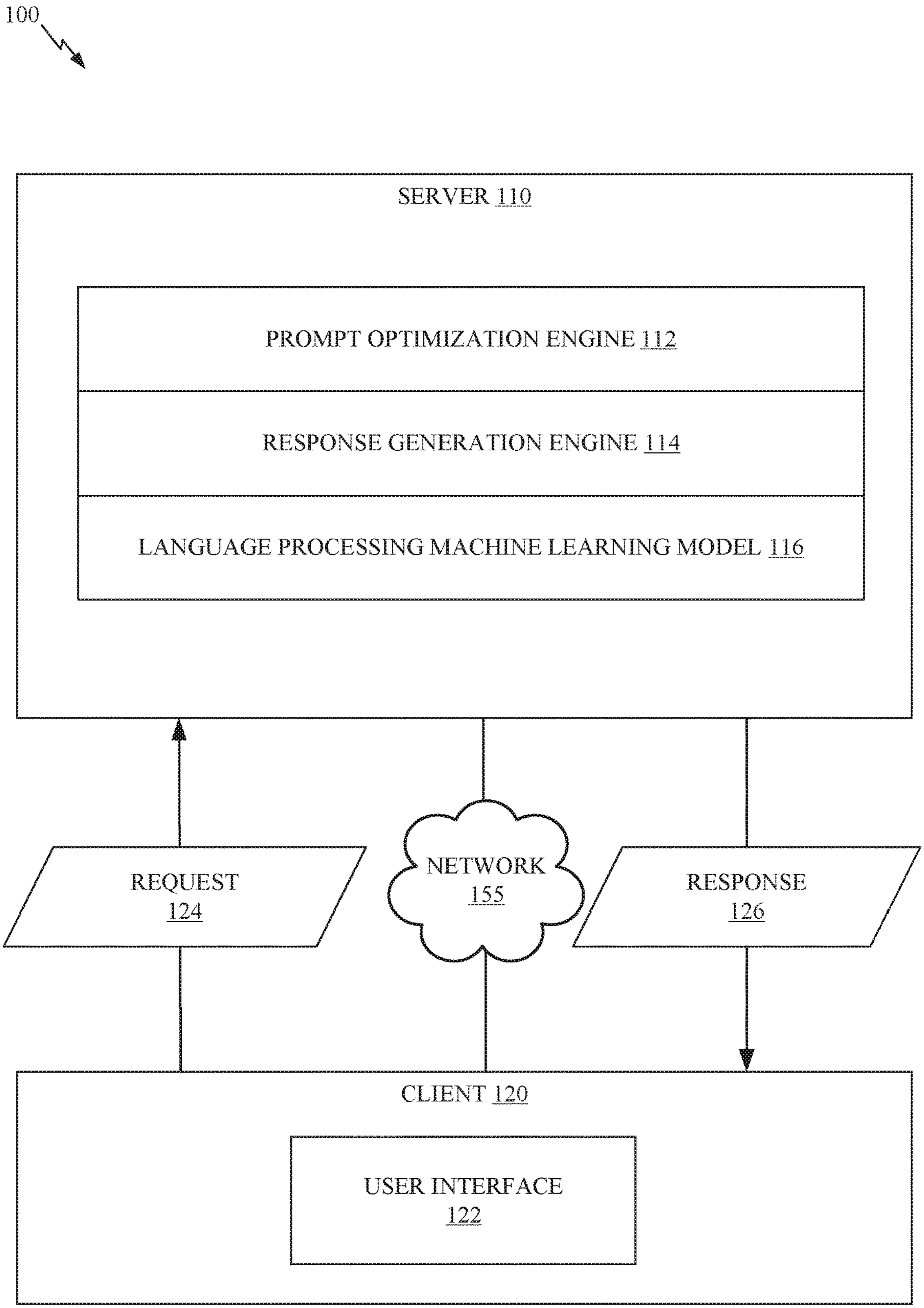
FIG. 1 is a block diagram illustrating an example computing environment for machine learning model prompt optimization, according to aspects of the present disclosure.

The present disclosure relates to a method and system for machine learning model prompt optimization. For example, techniques described herein enable automatically improving natural-language prompts used to control a language processing machine learning model such as a large language model (LLM). The system starts with a population of candidate prompts and repeatedly tests those prompts on a task dataset (e.g., by providing the prompts to a language processing machine learning model and evaluating the model's outputs against ground truth or target data) to measure how well each prompt performs. Rather than relying only on small random text edits or purely evolutionary selection, the system uses a representation of each prompt in an embedding space to guide how each prompt should change in a given iteration.

During an iteration, the system identifies strong prompts and weak prompts from the measured fitness scores. The system uses the strong prompts to define an "attraction" direction in the embedding space, and it converts one or more weak prompts into "predator" vectors that define "repulsion" directions. These predator vectors form an adaptive pressure field that discourages new prompts from collapsing into semantic regions that have already been observed to perform poorly or that correspond to overcrowded local optima. The system can further update predator vectors by moving them toward centroids of nearby prompt embeddings (and optionally adding controlled noise), which helps the repulsion field track where the candidate prompts are clustering.

Because prompts are discrete natural-language artifacts, the system does not attempt to directly invert an embedding-space update into text. Instead, it generates multiple discrete textual edits of a given prompt (for example, rephrasing, synonym substitution, instruction reordering, and/or template parameter changes), embeds the edited prompts, and selects the edited prompt whose embedding is closest to a computed target embedding. This hybrid approach provides technical improvements over prior techniques by reducing premature convergence to local optima through explicit, data-driven repulsion from weak regions, while preserving prompt validity and interpretability by realizing updates as discrete edits rather than continuous latent-space optimization.

After the prompt optimization process identifies a selected prompt (e.g., a highest-fitness prompt or another prompt from a final set of candidate prompts that satisfies a configured acceptance criterion), the computing system may use the selected prompt during an inference phase to generate responses using the language processing machine learning model (e.g., for subsequently received inputs). In this operational mode, the selected prompt may be supplied, such as along with a user query, request, or other task input as model context, and the model generates an output sequence conditioned on that selected prompt. Because the selected prompt is chosen based on measured fitness over a task dataset and refined through embedding-guided attraction toward high-performing prompts and repulsion from embedding regions associated with low-performing prompts, use of the selected prompt yields improved task accuracy and robustness relative to prompts selected by random edit search, manual trial and error, or purely local automated refinement that can become trapped in locally optimal prompt variants. This improvement is realized without requiring additional gradient-based training of the model and without requiring inversion of continuous embedding updates into text, thereby enabling deployment in production systems that use discrete, human-readable prompts and supporting prompt updates that remain interpretable and auditable.

Example Computing Components Related to Machine Learning Model Prompt Optimization FIG. 1 illustrates a block diagram of a computing environment 100 related to machine learning model prompt optimization. The computing environment 100 may include a server 110 and a client 120 connected via a network 155.

Server 110 may comprise one or more processors and a memory storing instructions. In some cases, server 110 may be an application server or other computing device that hosts a computing application accessed by one or more users, such as via user interface 122 on client 120.

The client 120 be a computing device by which a user interacts with a computing application, and may include a user interface 122 that enables such interaction. The client 120 may send a request 124 through the network 155 to the server 110, and may receive a response 126 back through the network 155 in response. For example, request 124 may be a request for information, to perform an operation, and/or the like, such as based on input provided by a user interacting with user interface 122 (e.g., providing natural language input, selecting a user interface element, and/or the like). In some aspects, request 124 is a natural language query.

Server 110 may generate response 126 (e.g., in response to request 124) through a process that involves the use of language processing machine learning model 116 and a prompt selected through a prompt optimization process performed by prompt optimization engine 112.

Response generation engine 114 may orchestrate generation of response 126, such as by providing request 124 along with a selected prompt (e.g., selected through an optimization process performed by prompt optimization engine 112) to language processing machine learning model 116 and receiving response 126 as an output from the model in response. Operation of response generation engine 114 is described in more detail below with respect to FIG. 4.

In some aspects, language processing machine learning model 116 may comprise a generative language model configured to generate natural-language and/or structured outputs in response to a prompt and, in some aspects, associated context. The language processing machine learning model 116 may be implemented as an autoregressive transformer decoder, an encoder-decoder transformer, another sequence-to-sequence neural network architecture, or another suitable type of language processing machine learning model. In some aspects, language processing machine learning model 116 is a large language model (LLM) or a small language model.

In certain aspects, language processing machine learning model 116 may be trained through supervised learning using large-scale pretraining on text corpora with a next-token prediction objective, optionally followed by supervised fine-tuning on instruction-following datasets and alignment training such as preference-based optimization or reinforcement learning from feedback. In some aspects, language processing machine learning model 116 is further adapted using domain-specific fine-tuning on task datasets associated with an application. In some aspects, the model parameters of language processing machine learning model 116 are updated over time by one or more offline workflows, including fine-tuning on new training examples.

The response generation engine 114 may return response 126 (e.g., which may be a natural language response) to client 120 accordingly via network 155, such as for display via user interface 122. User feedback with respect to response 126 may be received via user interface 122, such as indicating correctness or incorrectness of response 126. Such feedback may be used to generate updated training data for one or more models, and such updated training data may be used to re-train and/or fine-tune one or more machine learning models (e.g., language processing machine learning model 116) for improved accuracy. Such feedback may also, in some aspects, be used to trigger a new round of a prompt optimization process in order to select a new prompt for use in subsequent response generation.

Prompt optimization engine 112 may be configured to generate and iteratively refine a set of candidate prompts for controlling a language processing machine learning model such as language processing machine learning model 116. In operation, prompt optimization engine 112 evaluates candidate prompts on a task dataset to obtain fitness scores, embeds the candidate prompts to obtain prompt embeddings, and identifies relatively strong and relatively weak candidates based on the fitness scores. Prompt optimization engine 112 maintains a set of predator vectors in an embedding space that impose repulsion away from embedding regions associated with weak performance and, in some implementations, updates predator locations based on neighborhoods of candidate prompt embeddings. For a given candidate prompt, prompt optimization engine 112 computes a target embedding that combines attraction toward an embedding of one or more high-fitness prompts with repulsion from the predator vectors, generates multiple discrete textual edits of the candidate prompt, embeds the edited prompts, and selects an edited prompt whose embedding is closest to the target embedding as an updated candidate prompt. In some aspects, prompt optimization engine 112 may repeat these operations across multiple iterations until a stopping criterion is satisfied and may output a selected prompt for subsequent use in generating model responses. Operation of prompt optimization engine 112 is described in more detail below with respect to FIGS. 2 and 3.

Example Workflow for Machine Learning Model Prompt Optimization

Figure 2:
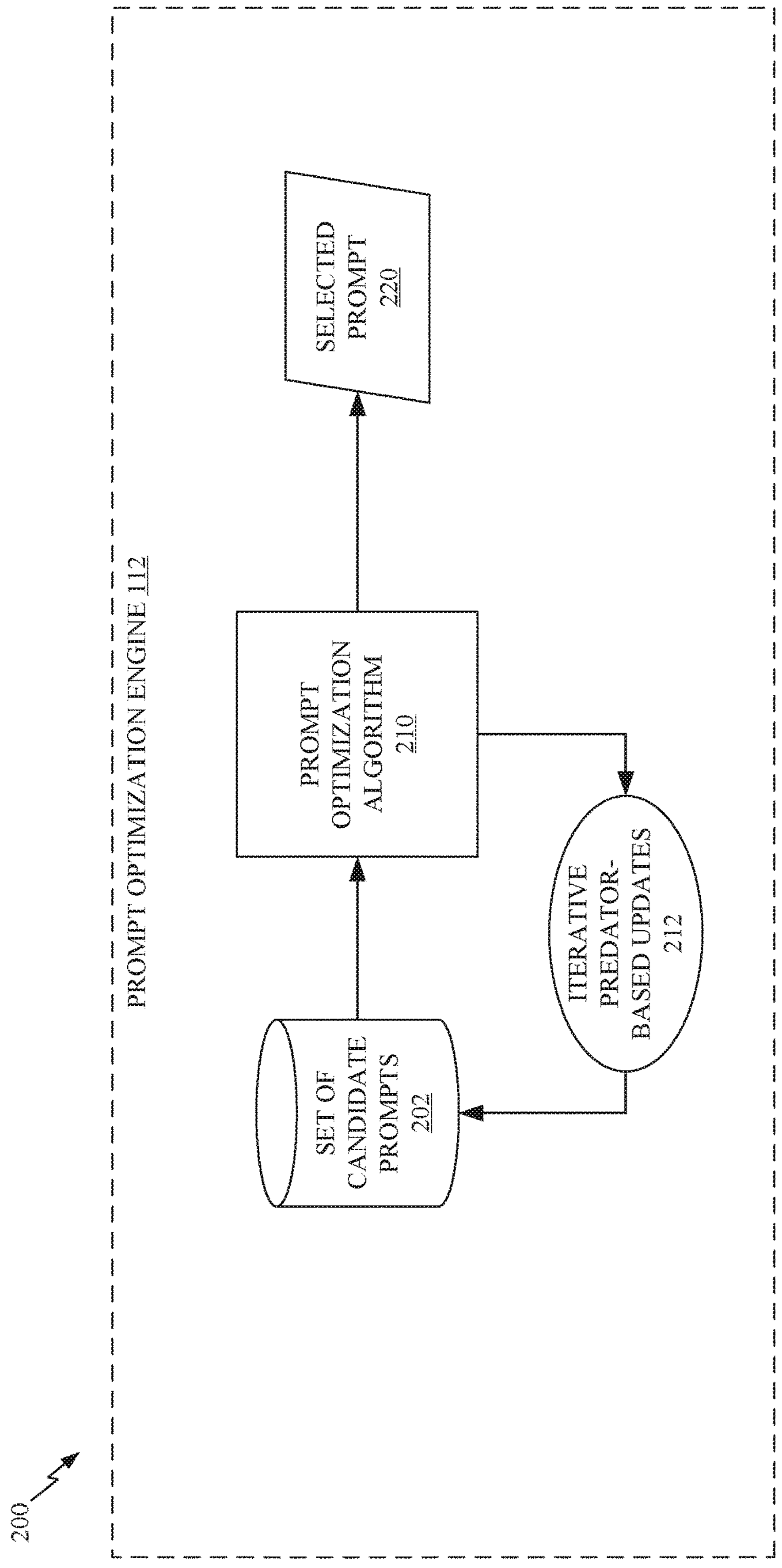
FIG. 2 illustrates a block diagram of an example workflow for machine learning model prompt optimization, according to aspects of the present disclosure.

FIG. 2 illustrates a block diagram 200 depicting an example workflow related to machine learning prompt optimization.

For example, block diagram 200 illustrates functionality of prompt optimization engine 112 of FIG. 1 where prompt optimization engine 112 generates a selected prompt 220 from a set of candidate prompts 202. In the example of FIG. 2, prompt optimization engine 112 includes, receives, or has access to, a set of candidate prompts 202 and a prompt optimization algorithm 210 that produces iterative predator-based updates 212 to the set of candidate prompts 202 and ultimately results in a selected prompt 220. Although shown as separate blocks for clarity, any of the illustrated functions may be combined, subdivided, or implemented by one or more components.

In operation, the set of candidate prompts 202 includes multiple alternative natural-language prompts intended to control a language processing machine learning model (e.g., language processing machine learning model 116 of FIG. 1) for a task (e.g., response generation). The prompt optimization algorithm 210 performs an iterative optimization cycle over the set of candidate prompts 202. During each iteration, the prompt optimization algorithm 210 may evaluate candidate prompts by applying each candidate prompt to a task dataset using the language processing machine learning model to produce task outputs, and by scoring the task outputs against corresponding reference outputs (e.g., ground truth outputs for the candidate prompts that have been confirmed through a manual review process and/or automatically confirmed, such as using a language processing machine learning model as a judge) to obtain a fitness score for each candidate prompt, such as an accuracy score aggregated across examples in the task dataset.

Prompt optimization engine 112 may generate a fitness score for each candidate prompt by executing an evaluation pass of the candidate prompt over a task dataset. For each example in the task dataset, the engine supplies the candidate prompt as part of model context to a language processing machine learning model (e.g., language processing machine learning model 116 of FIG. 1) and causes the model to generate a task output for that example (e.g., an answer, classification, extraction result, or other task-specific output). The engine then evaluates the task output against a corresponding reference output associated with the example, such as ground-truth labels or target answers that have been curated, validated, or otherwise designated as correct. The comparison between the task outputs and the reference outputs may involve, for example, semantic comparison based on embeddings, such as determining the cosine similarity between an embedding of a task output and an embedding of a corresponding reference output and computing a score based on the cosine similarity. The engine assigns a per-example score based on a configured scoring function for the task, and aggregates the per-example scores across the task dataset to produce the fitness score for the candidate prompt, for example as an accuracy value, a weighted accuracy value, or another scalar metric reflecting task performance. In some implementations, the engine normalizes the aggregated score, applies penalties for invalid or non-conforming outputs, and stores the resulting fitness score for use in identifying best-performing and worst-performing candidate prompts in the iteration.

The prompt optimization algorithm 210 may involve generating a prompt embedding for each candidate prompt (e.g., using an embedding model), thereby representing each candidate prompt as a vector in an embedding space suitable for computing distances and directions.

An embedding generally refers to a vector representation of an entity (e.g., in this case, the combined content of a triple) that represents the entity as a vector in n-dimensional space such that similar entities are represented by vectors that are close to one another in the n-dimensional space. Embeddings may be generated through the use of an embedding model, such as a neural network or other type of machine learning model that learns a representation (embedding) for an entity through a training process that trains the neural network based on a data set, such as a plurality of features of a plurality of entities. In one example, an embedding model used to generate embeddings comprises a Bidirectional Encoder Representations from Transformer (BERT) model, which involves the use of masked language modeling to determine embeddings. In a particular example, the embedding model comprises a Sentence-BERT model. In other embodiments, the embedding model may involve embedding techniques such as Word2Vec and GloVe embeddings. These are included as examples, and other techniques for generating embeddings are possible. An embedding model employed during techniques described herein may be a pre-trained or domain-adapted embedding machine learning model.

The prompt optimization algorithm may maintain and update a set of predator vectors in the embedding space that impose repulsion away from embedding regions associated with poor performance and, in some implementations, away from overcrowded regions corresponding to clusters of candidate prompts. In certain implementations, the set of predator vectors is initialized by generating vectors that are distributed across the embedding space to encourage broad exploration at startup. As candidate prompts are evaluated, prompt optimization algorithm 210 may inject at least one new predator vector derived from the prompt embedding of a globally lowest-fitness candidate prompt (optionally with added noise) from the current version of the set of candidate prompts so that regions associated with observed weak performance exert increased repulsive influence in subsequent iterations. Prompt optimization algorithm 210 may also update positions of existing predator vectors by identifying neighborhoods of prompt embeddings near a predator vector (for example, within a distance threshold or among a configured number of nearest prompt embeddings), computing a centroid of the neighborhood, and moving the predator vector toward the centroid, optionally with stochastic movement noise. This movement causes predator vectors to track clusters of candidate prompts and thereby apply adaptive pressure against premature convergence around local optima.

Based on the evaluation results and the predator vectors, the prompt optimization algorithm 210 updates candidate prompts in the set of candidate prompts 202 via iterative predator-based updates 212. For a given candidate prompt, the prompt optimization algorithm 210 may compute a target embedding that combines an attraction term toward an embedding of a highest-fitness prompt (e.g., a prompt in the set of candidate prompts with a highest fitness score) and a repulsion term away from the predator vectors (e.g., where one or more of the predator vectors may be generated based on a lowest-fitness prompt, such as a prompt in the set of candidate prompts with a lowest fitness score). In some implementations, the attraction strength, repulsion strength, and/or an exploration noise magnitude are controlled using global state variables representing aggregate prey quality and aggregate predator pressure that evolve across iterations in a predator prey relationship, thereby balancing exploitation of high-performing prompts with exploration away from weak or congested regions.

Because the prompts in the set of candidate prompts 202 are discrete natural-language artifacts, the prompt optimization algorithm 210 realizes embedding-guided movement through discrete textual edits rather than by directly inverting an embedding vector to text. In particular, for a given candidate prompt, the prompt optimization algorithm 210 may generate multiple edited prompts using discrete edits such as rephrasing, synonym substitution, instruction reordering, adding or removing examples, and/or template parameter updates. The algorithm may embed the edited prompts and select an edited prompt whose edited-prompt embedding is closest to the computed target embedding, and the selected edited prompt replaces, or is stored as an updated version of, the given candidate prompt (e.g., at iterative predator-based updates 212) in the set of candidate prompts 202 for use in the next iteration.

After one or more iterations (for example, after a fixed iteration budget is exhausted or when improvements fall below a threshold), the prompt optimization engine 112 determines a selected prompt 220 from a final version of the set of candidate prompts 202. The selected prompt 220 may be a highest-fitness prompt from a final iteration or another prompt satisfying an acceptance criterion. The computing system may then use the selected prompt 220 during an inference phase by providing the selected prompt 220 as context to the language processing machine learning model, such as in connection with subsequently received inputs (e.g., from a user), thereby improving task accuracy and robustness relative to purely local randomized edit search, manual prompt optimization, or other existing automated prompt optimization techniques.

Example Operations for Machine Learning Model Prompt Optimization

Figure 3:
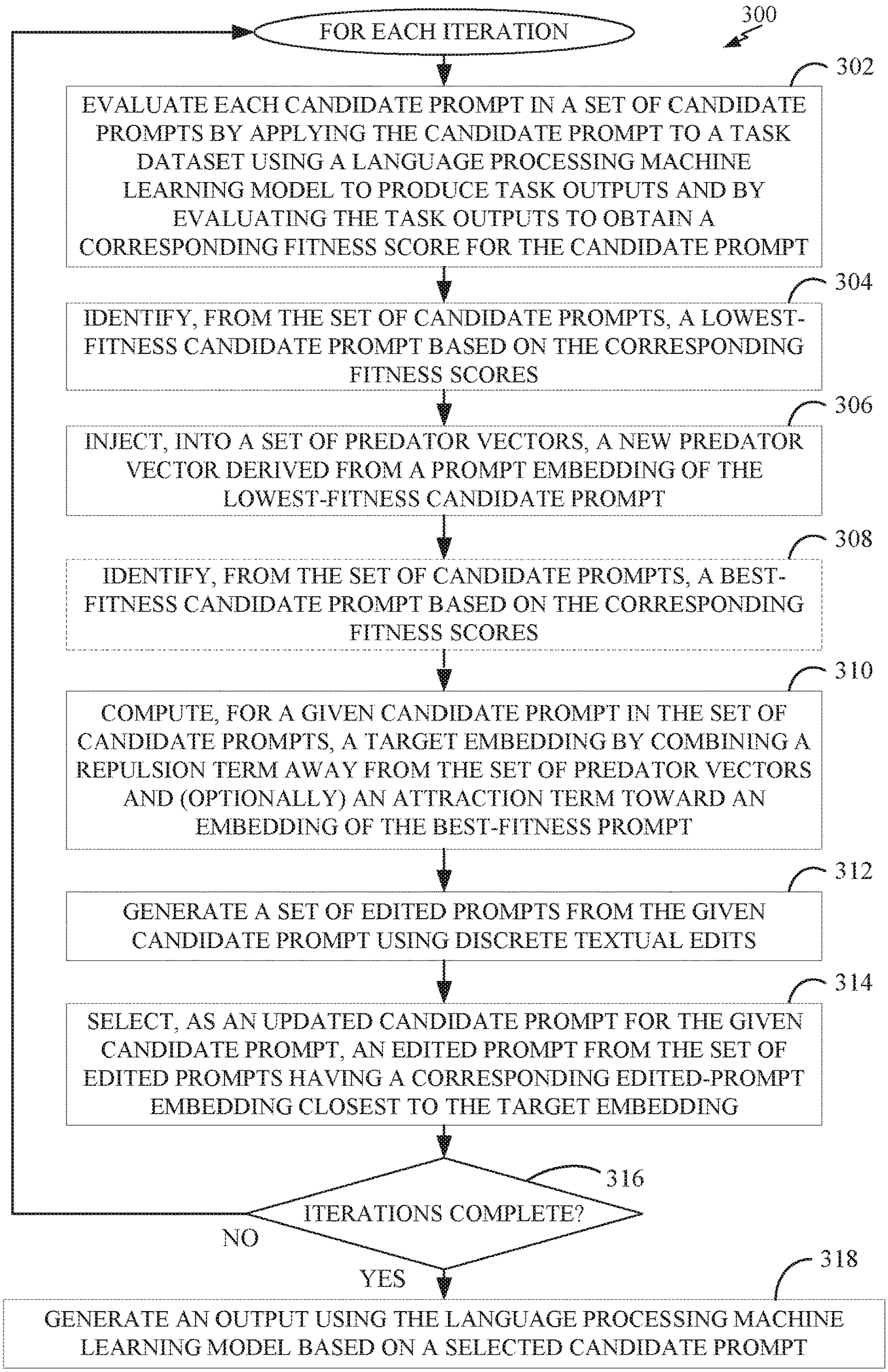
FIG. 3 is a block diagram illustrating example operations related to machine learning model prompt optimization, according to aspects of the present disclosure.

FIG. 3 is a block diagram 300 illustrating example operations related to machine learning model prompt optimization, according to aspects of the present disclosure. For example, the operations in block diagram 300 may be performed by one or more components described above (e.g., prompt optimization engine 112 and/or response generation engine 114 of FIG. 1) or below (e.g., system 500A and/or 500B of FIG. 5A and/or FIG. 5B).

In some aspects, the process depicted in block diagram 300 is performed by one or more computing systems executing a prompt optimization engine (e.g., prompt optimization engine 112 of FIG. 1 and/or FIG. 2). Although the steps are illustrated in a particular order, in other implementations one or more steps may be performed in a different order, repeated, omitted, or combined, consistent with the present disclosure.

The system performs certain operations (e.g., represented by blocks 302, 304, 306, 308, 310, 312, and 314) for each iteration of a prompt optimization cycle. In an iteration, the system maintains a set of candidate prompts (prey) represented as discrete natural-language strings and a set of predator vectors in an embedding space.

In some aspects, prior to a first iteration, the prompt optimization engine initializes a set of predator vectors as a set of points in the embedding space that are not required to correspond to valid natural-language prompts. The predator vectors may be generated using random sampling in the embedding space and may be selected to promote coverage of the embedding space. For example, the engine may generate a pool of candidate predator vectors and select a subset that is distributed across the embedding space according to a dispersion criterion, such as maximizing a minimum pairwise distance among selected predator vectors or satisfying a minimum separation threshold, thereby reducing the likelihood that initial predator influence is concentrated in a single semantic region.

At block 302, the system evaluates each candidate prompt in the set of candidate prompts. In one example, for a given candidate prompt the system applies the candidate prompt to examples in a task dataset by supplying the prompt as context to a language processing machine learning model and causing the model to generate task outputs for the examples. The system then evaluates the task outputs against reference outputs for the examples to compute a fitness score for the candidate prompt. The fitness score may be an accuracy score aggregated across the task dataset, a weighted accuracy score, or another scalar measure of task performance. In some implementations, the system assigns per-example scores using a configured scoring function, applies penalties for invalid or non-conforming outputs, and/or normalizes or otherwise transforms the aggregated score. The resulting fitness scores are stored for use in identifying strong and weak candidate prompts during the iteration.

At block 304, the system identifies, from the set of candidate prompts, a lowest-fitness candidate prompt based on the corresponding fitness scores. The lowest-fitness candidate prompt may be the globally worst-performing prompt in the current iteration or may be selected from a subset of the lowest-performing prompts (e.g., a worst-K set) based on a configured policy.

At block 306, the system injects, into the set of predator vectors, a new predator vector derived from a prompt embedding of the lowest-fitness candidate prompt. In one implementation, the system generates a prompt embedding for the lowest-fitness candidate prompt using an embedding model and uses the prompt embedding as the new predator vector. In another implementation, the system adds a noise vector (e.g., a small Gaussian noise vector, where "small" means the variance (and standard deviation) is low, keeping the noise magnitude close to the mean) to the prompt embedding to diversify predator locations and avoid creating a degenerate repulsion field concentrated at a single point. Injecting predator vectors derived from weak prompts increases repulsive influence away from embedding regions associated with observed poor task performance, thereby reducing the likelihood that subsequent prompt updates collapse into those regions.

In some aspects, instead of injecting a single predator vector from only a globally lowest-fitness candidate prompt, the prompt optimization engine identifies a subset of lowest-performing candidate prompts in the iteration, such as a worst-K set determined by ranking the candidate prompts by fitness score. For each candidate prompt in the subset, the prompt optimization engine may inject a corresponding new predator vector derived from the prompt embedding of that candidate prompt, optionally with added noise, thereby strengthening repulsion away from multiple embedding regions associated with poor task performance.

In certain aspects, the prompt optimization engine determines, for each predator vector, a neighborhood score that controls a magnitude of a predator update toward a neighborhood centroid. The neighborhood score may represent a measure of poor performance or congestion of candidate prompts near the predator vector. For example, the engine may compute a neighborhood badness score by aggregating, over candidate prompts in the neighborhood, values derived from the fitness scores such that lower fitness corresponds to higher badness. The engine then updates the predator vector by moving the predator vector toward the centroid of the neighborhood with a step size scaled by the neighborhood score, optionally with added stochastic movement noise. In this manner, predator vectors may move more aggressively toward regions that are measured to be undesirable or that indicate premature convergence, thereby increasing repulsive pressure in those regions in subsequent iterations.

At block 308 (which may be optional), the system identifies, from the set of candidate prompts, a highest-fitness candidate prompt based on the corresponding fitness scores. The highest-fitness candidate prompt may be the globally best-performing prompt in the current iteration, and its embedding may be used to define an attraction direction for other candidate prompts.

Blocks 310, 312, and 314, in some aspects, may be performed for each given candidate prompt in the set of candidate prompts.

At block 310, the system computes, for a given candidate prompt in the set of candidate prompts, a target embedding by combining a repulsion term away from the set of predator vectors and (optionally, in some aspects) an attraction term toward an embedding of the highest-fitness prompt. The attraction term pulls the given candidate prompt toward a semantic region associated with strong performance as represented by the highest-fitness prompt embedding. The repulsion term pushes the given candidate prompt away from semantic regions represented by the predator vectors, including regions associated with poor performance and, in some implementations, regions where candidate prompts have become overly clustered around a local optimum. In certain aspects, the repulsion term is computed as a sum of normalized direction vectors away from each predator vector, where each contribution is scaled based on distance (e.g., inversely with squared distance plus an $\epsilon$ term, which is a small, non-zero constant added to a mathematical expression such as to a denominator to prevent numerical problems such as division by zero or extremely large values to avoid singularities). In certain aspects, the repulsion term includes an $\epsilon$ term added to a distance-based denominator so that when an embedding of a candidate prompt is very close to a predator vector, the denominator does not approach zero and the repulsion contribution remains finite, thereby avoiding singularities and improving numerical stability.

In some aspects, the system further adds a stochastic exploration component (e.g., Gaussian noise) to the target embedding to promote exploration and prevent premature convergence. The stochastic exploration component can be implemented as a random vector sampled from a Gaussian distribution and scaled by a configurable magnitude so that the candidate prompt's target embedding is intentionally perturbed in different directions across iterations. This controlled randomness helps the optimization avoid repeatedly making only small, locally improving edits and instead encourages exploring alternative semantic regions that may yield higher task fitness. In some aspects, the strength of attraction, the strength of repulsion, and the magnitude of exploration noise are controlled using global state variables that evolve across iterations to model predator-prey dynamics, such as a prey-quality variable representing aggregate prompt quality and a predator-pressure variable representing aggregate predator pressure. For example, in certain aspects, the system maintains global state variables that summarize the overall state of the optimization and uses those variables to adapt how aggressively prompts are moved in the embedding space from one iteration to the next. For instance, a prey-quality variable can represent an aggregate measure of how well the current population of candidate prompts performs on the task dataset, while a predator-pressure variable can represent an aggregate measure of the repulsive influence imposed by the current set of predator vectors. The system updates these variables across iterations (e.g., using a coupled update rule that models predator-prey dynamics) and then maps their current values to control parameters used in the prompt update computation, such as an attraction strength toward a best-performing prompt embedding, a repulsion strength away from predator vectors, and a magnitude of stochastic exploration noise added to a target embedding. By adjusting these parameters in response to the evolving global state, the system can dynamically balance exploitation of high-performing prompt regions (stronger attraction and/or reduced noise when quality is improving) against exploration and escape from local optima (stronger repulsion and/or increased noise when the population appears to be stagnating or overly clustered), improving the likelihood of finding higher-performing prompts within a fixed evaluation budget.

In some implementations, the prompt optimization engine maintains global state variables that evolve across iterations to model predator-prey dynamics. For example, the engine may maintain a prey-quality variable that represents an aggregate quality of the current set of candidate prompts and a predator-pressure variable that represents an aggregate pressure imposed by the current set of predator vectors. The prey-quality variable may be computed from the fitness scores of the candidate prompts, such as by averaging, weighting, or otherwise aggregating the fitness scores across the current population.

In some implementations, the engine updates the prey-quality variable based on a coupled update rule in which the prey-quality variable increases as a function of its current value but decreases as the predator-pressure variable increases, thereby reflecting that increased predator pressure reduces prey population health. In some implementations, the engine updates the predator-pressure variable based on a coupled update rule in which the predator-pressure variable increases as a function of its current value and increases as the prey-quality variable increases, thereby reflecting that higher prey quality supports increased predator pressure.

The coupled updates may be performed once per iteration, and the update magnitudes may be scaled by a configured step size.

The prompt optimization engine may use one or both of the prey-quality variable and the predator-pressure variable to set one or more control parameters for the iteration, including a strength of an attraction term toward an embedding of a highest-fitness candidate prompt, a strength of a repulsion term away from the set of predator vectors, and a magnitude of stochastic exploration noise added when computing target embeddings for candidate prompts. In this manner, the engine can increase exploration when the population is stagnating or overly clustered, and increase exploitation when the population is improving, without requiring gradient-based training of the language processing machine learning model.

At block 312, because candidate prompts are discrete natural-language artifacts, the system generates a set of edited prompts from the given candidate prompt using discrete textual edits, rather than attempting to directly invert the target embedding into text. Example discrete textual edits include rephrasing one or more instructions, substituting synonyms or alternative phrases, modifying an ordering of instructions, adding or removing constraints, inserting or modifying examples, and updating template parameter values within a prompt template. The system may generate the edited prompts using one or more prompt-edit generators, rule-based transformations, or model-assisted rewriting techniques, while enforcing formatting or policy constraints configured for the task.

At block 314, the system selects, as an updated candidate prompt for the given candidate prompt, an edited prompt from the set of edited prompts having a corresponding edited-prompt embedding closest to the target embedding. In one implementation, the system embeds each edited prompt using the embedding model to obtain an edited-prompt embedding and computes a distance metric (e.g., cosine distance or Euclidean distance) between the edited-prompt embedding and the target embedding. The system then selects the edited prompt that minimizes the distance and stores the selected edited prompt as the updated candidate prompt for the given candidate prompt, to be used in a subsequent iteration. In some implementations, the system further evaluates the selected edited prompt on at least a portion of the task dataset and replaces the given candidate prompt only if the selected edited prompt satisfies a fitness improvement criterion or other acceptance test. The selected edited prompt (e.g., if it satisfies a fitness criterion or acceptance test, in some aspects) may replace the given candidate prompt in the set of candidate prompts that will be used in a subsequent iteration and/or from which a final selected prompt will be chosen.

In some aspects, after selecting an edited prompt whose edited-prompt embedding is closest to the target embedding, the prompt optimization engine evaluates the selected edited prompt to determine whether to replace the prior version of the candidate prompt. For example, the engine may evaluate the selected edited prompt on at least a portion of the task dataset and determine an edited-prompt fitness score. The prompt optimization engine may replace the prior candidate prompt with the selected edited prompt when the edited-prompt fitness score satisfies an acceptance criterion, such as exceeding the prior fitness score by at least a threshold margin, meeting a minimum fitness threshold, or reducing a penalty for invalid or non-conforming outputs.

At block 316, the system determines whether the iterations are complete. A stopping criterion may include exhausting a fixed iteration budget, reaching a configured fitness threshold, detecting that improvements between successive iterations fall below a threshold, or meeting a compute budget or time limit. If the stopping criterion is not satisfies, then a new iteration may begin, such as returning to block 302 using the updated set of candidate prompts (e.g., including a selected edited version of each candidate prompt based on techniques described herein) and proceeding through blocks 304, 306, 308, 310, 312, 314, and 316.

At block 318, after the stopping criterion is satisfied, the system generates an output using the language processing machine learning model based on a selected candidate prompt. In one implementation, the selected candidate prompt is a highest-fitness candidate prompt from a final iteration or another candidate prompt satisfying an acceptance criterion. The system supplies the selected prompt as context, such as together with one or more subsequently received task inputs (e.g., which may include one or more user inputs, such as request 124 of FIG. 1), and uses the language processing machine learning model to generate one or more responses conditioned on the selected prompt. Because the selected prompt has been optimized using measured fitness on a task dataset and refined using embedding-guided attraction toward high-performing prompts and repulsion from predator vectors derived from weak prompts, use of the selected prompt improves task accuracy and robustness relative to random edit search, manual prompt tuning, or other automated local refinement techniques that can become trapped in local optima.

Example Response Generation Based on Machine Learning Model Prompt Optimization

Figure 4:
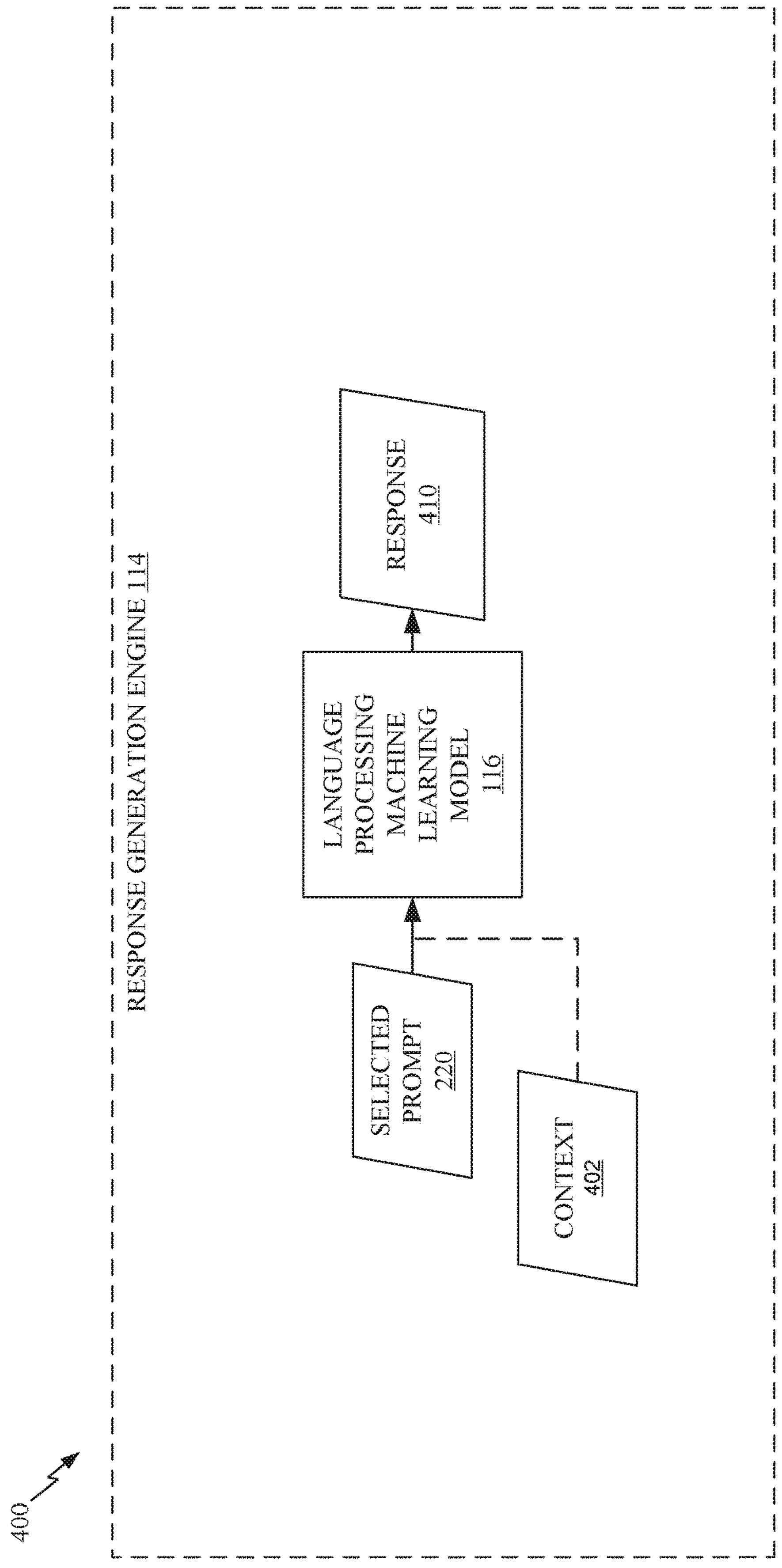
FIG. 4 is a block diagram illustrating a response generation process related to machine learning model prompt optimization, according to aspects of the present disclosure.

FIG. 4 is a block diagram 400 illustrating an example response generation process that uses a prompt selected through a prompt optimization procedure (e.g., described above with respect to FIGS. 1-3). In the example of FIG. 4, response generation engine 114 of FIG. 1 receives or accesses context 402 and selected prompt 220 of FIG. 2. Context 402 can include one or more task inputs, such as a user query, request, or other natural-language input, and may further include session state, conversation history, retrieved documents, tool outputs, formatting constraints, and/or other auxiliary information used as model input.

Response generation engine 114 supplies at least the selected prompt 220 and the context 402 to language processing machine learning model 116 as inputs. The language processing machine learning model 116 generates a response 410 conditioned on the selected prompt 220 and the context 402. Response 410 can include any suitable task output, such as a natural-language answer, a classification label, an extracted field value, a structured output (e.g., a JavaScript Object Notation (JSON) object), or another sequence output consistent with the task configuration. Response 410 may, for example, be output via a user interface, such as in response to a user request, and/or may be provided to one or more other components for further processing. For example, response 410 may correspond to response 126 of FIG. 1.

In some implementations, selected prompt 220 is produced by an offline optimization procedure that evaluates a population of candidate prompts on a task dataset and iteratively refines those prompts using embedding-guided updates. For example, as described above with respect to FIGS. 2 and 3, the optimization procedure can measure a fitness score for each candidate prompt based on task accuracy over the task dataset, use a best-performing candidate prompt to define an attraction direction in embedding space, and use one or more low-performing candidate prompts to derive predator vectors that define repulsion away from embedding regions associated with poor task performance. Because prompts are discrete natural-language artifacts, the optimization procedure can realize embedding-guided movement by generating multiple discrete edits of a prompt (e.g., rephrasing, synonym substitution, instruction reordering, adding or removing constraints or examples, or adjusting template parameters), embedding the edited prompts, and selecting an edited prompt whose embedding is closest to a computed target embedding. The selected prompt 220 may be the highest-fitness prompt from a final iteration of the optimization process or another prompt (from a set determined through the optimization process) that satisfies an acceptance criterion.

Therefore, FIG. 4 depicts an operational mode in which the selected prompt 220, having been chosen based on measured fitness and refined to improve task accuracy while mitigating premature convergence to local optima, is used as stable, control input for language processing machine learning model 116. In this mode, response generation engine 114 can repeatedly apply the selected prompt 220 to subsequently received contexts to generate responses 410 with improved robustness and accuracy relative to prompts obtained through manual trial-and-error or purely local randomized editing, without requiring additional gradient-based training of the language processing machine learning model 116.

In some aspects, the prompt optimization procedure is performed as an offline workflow, for example during a development or configuration phase for a production system, because evaluation of candidate prompts can require repeated invocations of the language processing machine learning model over a task dataset. After the offline workflow produces a selected prompt, the production system may use the selected prompt for subsequent inference requests until a re-optimization condition is satisfied.

In certain aspects, a re-optimization condition is triggered based on one or more of: receipt of additional labeled examples for the task dataset, a model version change associated with the language processing machine learning model, detection of a degradation in response quality based on monitoring metrics, receipt of user feedback indicating incorrect responses, and/or the like. Upon detecting the re-optimization condition, the system may execute a new offline prompt optimization procedure to produce an updated selected prompt, which may then be used in subsequent response generation processes.

Example Mathematical Formulation of Prompt Optimization Dynamics

In some implementations, the operations of the prompt optimization engine are described using an explicit mathematical formulation that couples global Lotka-Volterra (LV) style dynamics with embedding-guided prompt and predator updates. The following provides one example of such a formulation; other formulations and parameterizations may be used.

In one aspect, the prompt optimization engine maintains global prey-quality and predator-pressure variables, denoted $X_t$ and $Y_t$, respectively, that summarize, for iteration t, an aggregate quality of the candidate prompts and an aggregate pressure exerted by the predator vectors, respectively. In some implementations, $X_t$ and $Y_t$ evolve according to LV-type update rules of the form $$X_{t+1} = X_t + \Delta t \cdot X_t(a - bY_t),$$

$$Y_{t+1} = Y_t + \Delta t \cdot Y_t(-c + dX_t),$$

where Δt is a step size and a, b, c, and d are parameters that control growth and interaction rates between prey and predators. Intuitively, the first equation reflects that prey quality tends to increase in proportion to itself but is reduced by predator pressure, while the second equation reflects that predator pressure tends to decay in isolation but increases when prey quality is high. In some aspects, the current values of $X_t$ and $Y_t$ at a given point are mapped to control parameters such as an attraction strength $\mu_t$, an exploration noise scale $\eta_t$, and a predator-movement scale $Y_t$.

Each candidate prompt $$P_i^t$$

at iteration t is associated with an embedding $$e_i^t \in \mathbb{R}^d.$$

The notation $\mathbb{R}^d$ denotes a d-dimensional real-valued vector space, so an embedding $$e_i^t \in \mathbb{R}^d$$

is represented as a d-component vector of real numbers. The best-performing candidate prompt (e.g., according to fitness scores) in iteration t has embedding $$e_{best}^t.$$

The system also maintains a set of predator vectors $$\{q_j^t \in \mathbb{R}^d\},$$

which represent pressure centers in the same embedding space. In some implementations, the system computes an LV target embedding $$\tilde{e}_i^{t+1}$$

for each candidate prompt $$P_i^t$$

using $$\tilde{e}_i^{t+1} = e_i^t + \mu_t(e_{best}^t - e_i^t) + \eta_t r_i^t + \sum_j \rho(Y_t)_r \frac{e_i^t - q_j^t}{\|e_i^t - q_j^t\|^2 + \epsilon},$$

where $$r_i^t \sim \mathcal{N}(0, I_d)$$

is a stochastic exploration noise vector and $\eta_t$ controls the magnitude of the noise. In some aspects, 0 denotes a d-dimensional mean vector whose components are all zero and $I_d$ denotes a d×d identity matrix, which serves as the covariance matrix and indicates unit variance in each dimension with no cross-correlation between dimensions. The term $$\mu_t(e_{best}^t - e_i^t)$$

pulls the candidate toward the current best-performing embedding, thereby encouraging exploitation. The summation term implements repulsion away from predator vectors, with the function $\rho(Y_t)$ scaling repulsion strength as a function of predator pressure. Each repulsion contribution is normalized by a squared distance plus a small constant $\epsilon$; the $\epsilon$ term prevents the denominator from approaching zero when $$e_i^t$$

is very close to a predator vector, avoiding singularities and improving numerical stability. The noise vector $$r_i^t$$

perturbs the target embedding to encourage exploration of alternative regions in the embedding space and to reduce premature convergence to local optima.

Because prompt embeddings are not directly inverted into natural-language text, the prompt optimization engine realizes the movement from $$e_i^t$$

toward $$\tilde{e}_i^{t+1}$$

through discrete textual edits. For a given candidate prompt $$P_i^t,$$

the prompt optimization engine generates a collection of edited prompts $$\{P_{i,k}^t\}$$

using discrete operations such as rephrasing, synonym substitution, reordering of instructions, addition or removal of examples, or modification of template parameters. Each edited prompt $$P_{i,k}^t$$

is embedded to obtain $$e_{i,k}^t,$$

and the next-iteration prompt is selected by $$P_i^{t+1} = \arg\min_{P_{i,k}^t} \|e_{i,k}^t - \tilde{e}_i^{t+1}\|,$$

where the norm may be, for example, a Euclidean norm or another distance measure in embedding space. In some aspects, the selected edited prompt is further evaluated on a portion of the task dataset, and the replacement $$P_i^{t+1} \leftarrow P_{i,k}^t$$

is performed only if an acceptance criterion based on fitness improvement is satisfied.

Predator injection and movement are also described in the embedding space. For a weak prompt $$P_w^t,$$

such as a globally lowest-fitness or worst-K candidate prompt, the engine forms a new predator vector as $$q_{new} = e_w^t + \epsilon_{inj} r_w,$$

where $$e_w^t$$

is the embedding of $$P_w^t, r_w \sim \mathcal{N}(0, I_d)$$

is small-magnitude Gaussian noise, and $\epsilon_{inj}$ controls the injection noise scale. This operation converts an observed weak region in the embedding space into a predator center, thereby increasing repulsive pressure that discourages subsequent prompts from collapsing back into that region.

For each existing predator $$q_j^t,$$

the engine may identify a neighborhood $N_j$ of nearby candidate embeddings, for example using a distance threshold or by selecting a configured number of nearest neighbors. The prompt optimization engine computes a neighborhood centroid $$c_j^t = \frac{1}{|N_j|}\sum_{i \in N_j} e_i^t,$$

and a neighborhood score $$F_j^t$$

representing local undesirability, such as an aggregate "badness" derived from fitness scores of candidates in $N_j$. The predator vector is updated according to $$q_j^{t+1} = q_j^t + \gamma_t F_j^t(c_j^t - q_j^t) + \xi_t z_j^t,$$

where $\gamma_t$ scales movement strength, $$z_j^t \sim N(0, I_d)$$

is a movement noise vector, and $\xi_t$ controls the magnitude of the stochastic motion. The term $$F_j^t(c_j^t - q_j^t)$$

moves the predator toward regions where prompts are both clustered and performing poorly or undesirably, while the noise term ensures that predators explore nearby regions rather than collapsing onto a single point. As predators move toward such regions, the repulsion term in the LV target embedding computation causes nearby candidate prompts to be pushed away, helping the system escape local optima and encouraging exploration of alternative high-performing semantic regions.

These equations provide one example implementation of the disclosed predator-prey inspired prompt optimization process. The specific functional forms, parameters, and mappings from $X_t$ and $Y_t$ to control variables $\mu_t$, $\eta_t$, $\gamma_t$, $\xi_t$, and $\rho(Y_t)$ may be adjusted, replaced, or augmented while remaining within the scope of the present disclosure.

Example Processing Systems

Figure 5A:
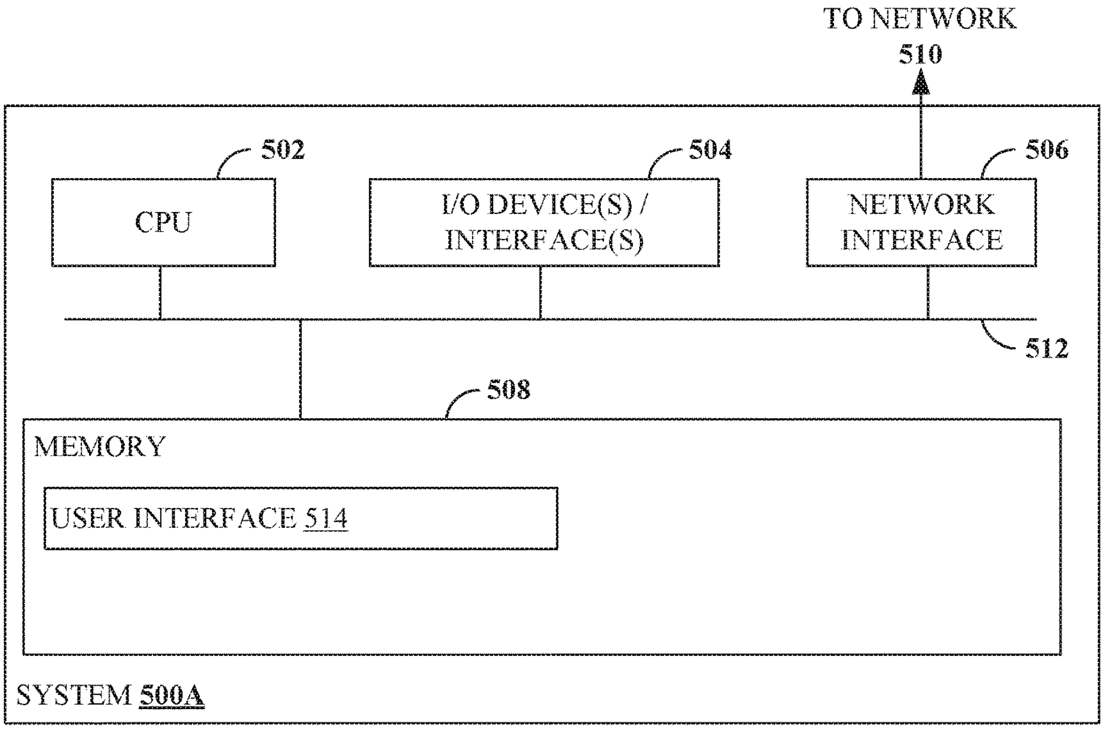
FIG. 5A and FIG. 5B illustrate block diagrams of two computing systems related to machine learning model prompt optimization, according to aspects of the present disclosure.

FIG. 5A illustrates an example system 500A with which embodiments of the present disclosure may be implemented. For example, system 500A may be configured to perform aspects of functionality described above with respect to FIGS. 1-4. In one example system 500A corresponds to client 120 of FIG. 1.

System 500A includes a central processing unit (CPU) 502, one or more I/O device interfaces 504 that may allow for the connection of various I/O devices (e.g., keyboards, displays, mouse devices, pen input, etc.) to the system 500A, network interface 506, a memory 508, and an interconnect 512. It is contemplated that one or more components of system 500A may be located remotely and accessed via a network 510. It is further contemplated that one or more components of system 500A may comprise physical components or virtualized components.

CPU 502 may retrieve and execute programming instructions stored in the memory 508. Similarly, the CPU 502 may retrieve and store application data residing in the memory 508. The interconnect 512 transmits programming instructions and application data, among the CPU 502, I/O device interface 504, network interface 506, and memory 508. CPU 502 is included to be representative of a single CPU, multiple CPUs, a single CPU having multiple processing cores, and other arrangements.

Additionally, the memory 508 is included to be representative of a random access memory or the like. In some embodiments, memory 508 may comprise a disk drive, solid state drive, or a collection of storage devices distributed across multiple storage systems. Although shown as a single unit, the memory 508 may be a combination of fixed and/or removable storage devices, such as fixed disc drives, removable memory cards or optical storage, network attached storage (NAS), or a storage area-network (SAN).

As shown, memory 508 includes a user interface 514, which may be representative of user interface 122 of FIG. 1. For example, a user may interact with user interface 122 to provide input text, submit input text, receive responses, provide feedback with respect to responses, perform other actions based on or in connection with input text and/or responses, and/or the like. For example, user feedback with respect to responses may be used to retrain one or more machine learning models through a supervised learning process for improved performance, such as machine learning model 558 of FIG. 5B.

Figure 5B:
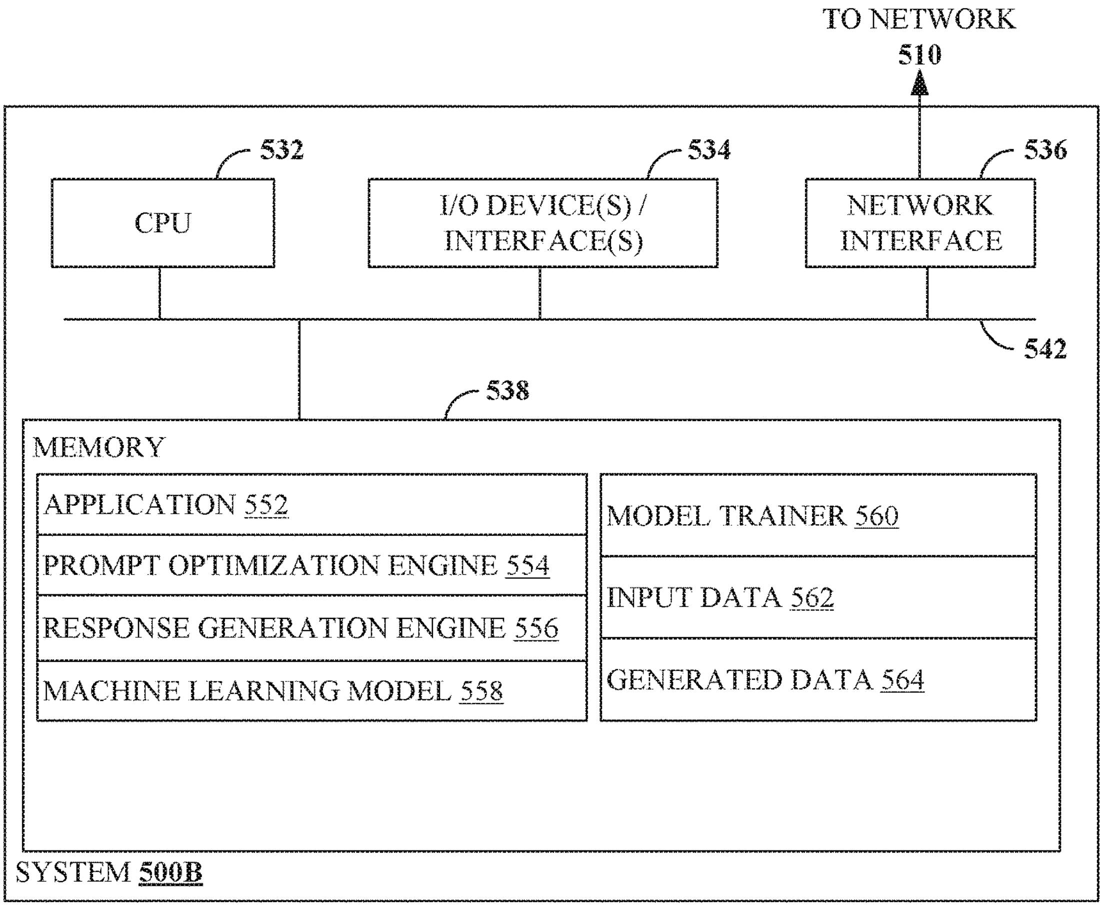

FIG. 5B illustrates another example system 500B with which embodiments of the present disclosure may be implemented. For example, system 500B may correspond to server 110 of FIG. 1.

System 500B includes a CPU 532, one or more I/O device interfaces 534 that may allow for the connection of various I/O devices (e.g., keyboards, displays, mouse devices, pen input, etc.) to the system 500B, network interface 536, a memory 538, and an interconnect 542. It is contemplated that one or more components of system 500B may be located remotely and accessed via a network 510. It is further contemplated that one or more components of system 500B may comprise physical components or virtualized components.

CPU 532 may retrieve and execute programming instructions stored in the memory 538. Similarly, the CPU 532 may retrieve and store application data residing in the memory 538. The interconnect 542 transmits programming instructions and application data, among the CPU 532, I/O device interface 534, network interface 536, and memory 538. CPU 532 is included to be representative of a single CPU, multiple CPUs, a single CPU having multiple processing cores, and other arrangements.

Additionally, the memory 538 is included to be representative of a random access memory or the like. In some embodiments, memory 538 may comprise a disk drive, solid state drive, or a collection of storage devices distributed across multiple storage systems. Although shown as a single unit, the memory 538 may be a combination of fixed and/or removable storage devices, such as fixed disc drives, removable memory cards or optical storage, network attached storage (NAS), or a storage area-network (SAN).

As shown, memory 538 includes an application 552, which may be representative of a computing application that performs language processing functionality, such as an application that includes an AI-assisted conversational system, a chat bot, or the like. In some aspects, user interface 514 of FIG. 5A provides user interface screens corresponding to application 552.

As shown, memory 538 further includes prompt optimization engine 554, response generation engine 556, and machine learning model 558, which may be representative of prompt optimization engine 112, response generation engine 114, and language processing machine learning model 116 FIG. 1. In some aspects, prompt optimization engine 554, response generation engine 556, and/or machine learning model 558 may be part of application 552, or may be separate from application 552.

Memory 538 may further include model trainer 560, which may perform aspects related to training machine learning model 558 and/or one or more other machine learning models (e.g., an embedding model, which may also be stored in memory 538). In other aspects, model trainer 560 may be located and executed on a separate system from the system on which such machine learning model(s) are run for use in dynamic response generation.

Memory 538 may further include input data 562, which may include request 124 of FIG. 1, set of candidate prompts 202 of FIG. 1, and/or selected prompt 220 and/or context 402 of FIG. 4, and/or the like. Memory 538 may further include generated data 564, which may include response 126 of FIG. 1, selected prompt 220 of FIG. 2, and/or response 410 of FIG. 4, and/or the like.

It is noted that systems 500A and 500B are included as examples, and certain functionality described with respect to systems 500A and/or 500B and/or otherwise described herein may be implemented via more or fewer devices and/or components.

EXAMPLE CLAUSES

Clause 1: A system for machine learning model prompt optimization, comprising: one or more processors; and a non-transitory computer readable medium storing instructions that, when executed by the one or more processors, cause the system to: generate, for each candidate prompt in a set of candidate prompts, a corresponding fitness score based on using a language processing machine learning model conditioned on the candidate prompt to produce task outputs and evaluating the task outputs; compute, for a given candidate prompt in the set of candidate prompts, based on the corresponding fitness scores of the set of candidate prompts, a target embedding based on applying a repulsion term away from a set of predator vectors comprising a predator vector that is based on a lowest-fitness candidate prompt in the set of candidate prompts; generate a set of edited prompts from the given candidate prompt using discrete textual edits; select, as an updated candidate prompt for the given candidate prompt, an edited prompt from the set of edited prompts based on the target embedding; and generate an output using the language processing machine learning model based on the updated candidate prompt.

Clause 2: The system of Clause 1 wherein the instructions, when executed by the one or more processors, further cause the system to identify, from the set of candidate prompts, a highest-fitness candidate prompt based on the corresponding fitness scores of the set of candidate prompts, wherein the computing of the target embedding for the given candidate prompt is further based on applying an attraction term towards an embedding of the highest-fitness candidate prompt.

Clause 3: The system of Clause 2, wherein the instructions, when executed by the one or more processors, further cause the system to update, based on the corresponding fitness scores, a prey-quality variable representing an aggregate quality of the set of candidate prompts and a predator-pressure variable representing an aggregate pressure imposed by the set of predator vectors.

Clause 4: The system of Clause 3, wherein the instructions, when executed by the one or more processors, further cause the system to: update the prey-quality variable by increasing the prey-quality variable by an amount that scales with a current value of the prey-quality variable and decreases as the predator-pressure variable increases; and update the predator-pressure variable by increasing the predator-pressure variable by an amount that scales with a current value of the predator-pressure variable and increases as the prey-quality variable increases, wherein the prey-quality variable or the predator-pressure variable is used to determine at least one of: a strength of the attraction term toward the embedding of the highest-fitness candidate prompt; a strength of the repulsion term away from the set of predator vectors; or a magnitude of stochastic exploration used when computing the target embedding.

Clause 5: The system of any one of Clause 1-4, wherein the computing of the target embedding further comprises computing a stochastic exploration term sampled from a multivariate Gaussian distribution.

Clause 6: The system of any one of Clause 1-5, wherein the computing of the target embedding further comprises computing, as the repulsion term, a sum over the set of predator vectors of direction vectors from respective predator vectors to an embedding of the given candidate prompt, each direction vector being normalized by a squared distance term plus an E term.

Clause 7: The system of any one of Clause 1-6, wherein the instructions, when executed by the one or more processors, further cause the system to update at least one predator vector in the set of predator vectors by moving the at least one predator vector within an embedding space toward a centroid of a neighborhood of prompt embeddings, and by adding stochastic movement noise to the at least one predator vector.

Clause 8: The system of Clause 7 wherein the instructions, when executed by the one or more processors, further cause the system to determine the neighborhood by identifying prompt embeddings that are within a distance threshold of the at least one predator vector in the embedding space or that are among a configured number of nearest prompt embeddings to the at least one predator vector.

Clause 9: The system of any one of Clause 1-8, wherein the generating of the set of edited prompts comprises generating at least one of: a rephrased prompt, a prompt with one or more substituted words, a prompt with a modified ordering of instructions, or a prompt with an updated template parameter value.

Clause 10: The system of any one of Clause 1-9, wherein the evaluating the task outputs comprises computing an accuracy score over a task dataset by comparing the task outputs to reference outputs and aggregating the accuracy score across examples in the task dataset.

Clause 11: The system of any one of Clause 1-10, wherein the instructions, when executed by the one or more processors, further cause the system to: identify, from the set of candidate prompts, the lowest-fitness candidate prompt based on the corresponding fitness scores of the set of candidate prompts; derive the predator vector from a prompt embedding of the lowest-fitness candidate prompt; and inject the predator vector into the set of predator vectors.

Clause 12: The system of Clause 11, wherein the injecting of the predator vector comprises adding a noise vector to the prompt embedding of the lowest-fitness candidate prompt.

Clause 13: A method for machine learning model prompt optimization, comprising: generating, for each candidate prompt in a set of candidate prompts, a corresponding fitness score based on using a language processing machine learning model conditioned on the candidate prompt to produce task outputs and evaluating the task outputs; computing, for a given candidate prompt in the set of candidate prompts, based on the corresponding fitness scores of the set of candidate prompts, a target embedding based on applying a repulsion term away from a set of predator vectors comprising a predator vector that is based on a lowest-fitness candidate prompt in the set of candidate prompts; generating a set of edited prompts from the given candidate prompt using discrete textual edits; selecting, as an updated candidate prompt for the given candidate prompt, an edited prompt from the set of edited prompts based on the target embedding; and generating an output using the language processing machine learning model based on the updated candidate prompt.

Clause 14: The method of Clause 13, further comprising identifying, from the set of candidate prompts, a highest-fitness candidate prompt based on the corresponding fitness scores of the set of candidate prompts, wherein the computing of the target embedding for the given candidate prompt is further based on applying an attraction term towards an embedding of the highest-fitness candidate prompt.

Clause 15: The method of Clause 14, further comprising updating, based on the corresponding fitness scores, a prey-quality variable representing an aggregate quality of the set of candidate prompts and a predator-pressure variable representing an aggregate pressure imposed by the set of predator vectors.

Clause 16: The method of claim 15, further comprising: updating the prey-quality variable by increasing the prey-quality variable by an amount that scales with a current value of the prey-quality variable and decreases as the predator-pressure variable increases; and updating the predator-pressure variable by increasing the predator-pressure variable by an amount that scales with a current value of the predator-pressure variable and increases as the prey-quality variable increases, wherein the prey-quality variable or the predator-pressure variable is used to determine at least one of: a strength of the attraction term toward the embedding of the highest-fitness candidate prompt; a strength of the repulsion term away from the set of predator vectors; or a magnitude of stochastic exploration used when computing the target embedding.

Clause 17: The method of Clause 13, wherein the computing of the target embedding further comprises computing a stochastic exploration term sampled from a multivariate Gaussian distribution.

Clause 18: The method of Clause 13, wherein the computing of the target embedding further comprises computing, as the repulsion term, a sum over the set of predator vectors of direction vectors from respective predator vectors to an embedding of the given candidate prompt, each direction vector being normalized by a squared distance term plus an $\epsilon$ term.

Clause 19: The method of Clause 13, further comprising updating at least one predator vector in the set of predator vectors by moving the at least one predator vector within an embedding space toward a centroid of a neighborhood of prompt embeddings, and by adding stochastic movement noise to the at least one predator vector.

Clause 20: A non-transitory computer readable medium comprising instructions that, when executed by one or more processors of a computing system, cause the computing system to: generate, for each candidate prompt in a set of candidate prompts, a corresponding fitness score based on using a language processing machine learning model conditioned on the candidate prompt to produce task outputs and evaluating the task outputs; compute, for a given candidate prompt in the set of candidate prompts, based on the corresponding fitness scores of the set of candidate prompts, a target embedding based on applying a repulsion term away from a set of predator vectors comprising a predator vector that is based on a lowest-fitness candidate prompt in the set of candidate prompts; generate a set of edited prompts from the given candidate prompt using discrete textual edits; select, as an updated candidate prompt for the given candidate prompt, an edited prompt from the set of edited prompts based on the target embedding; and generate an output using the language processing machine learning model based on the updated candidate prompt.

ADDITIONAL CONSIDERATIONS

The preceding description provides examples, and is not limiting of the scope, applicability, or embodiments set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The preceding description is provided to enable any person skilled in the art to practice the various embodiments described herein. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and other operations. Also, "determining" may include receiving (e.g., receiving information), accessing (e.g., accessing data in a memory) and other operations. Also, "determining" may include resolving, selecting, choosing, establishing and other operations.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

A processing system may be implemented with a bus architecture. The bus may include any number of interconnecting buses and bridges depending on the specific application of the processing system and the overall design constraints. The bus may link together various circuits including a processor, machine-readable media, and input/output devices, among others. A user interface (e.g., keypad, display, mouse, joystick, etc.) may also be connected to the bus. The bus may also link various other circuits such as timing sources, peripherals, voltage regulators, power management circuits, and other types of circuits, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media, such as any medium that facilitates transfer of a computer program from one place to another. The processor may be responsible for managing the bus and general processing, including the execution of software modules stored on the computer-readable storage media. A computer-readable storage medium may be coupled to a processor such that the processor can read information from, and write information to, the storage medium. In the alternative, the storage medium may be integral to the processor. By way of example, the computer-readable media may include a transmission line, a carrier wave modulated by data, and/or a computer readable storage medium with instructions stored thereon separate from the wireless node, all of which may be accessed by the processor through the bus interface. Alternatively, or in addition, the computer-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module, it will be understood that such functionality is implemented by the processor when executing instructions from that software module.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A system for machine learning model prompt optimization, comprising:
- one or more processors; and
- a non-transitory computer readable medium storing instructions that, when executed by the one or more processors, cause the system to:
  - generate, for each candidate prompt in a set of candidate prompts, a corresponding fitness score based on using a language processing machine learning model conditioned on the candidate prompt to produce task outputs and evaluating the task outputs;
  - compute, for a given candidate prompt in the set of candidate prompts, based on the corresponding fitness scores of the set of candidate prompts, a target embedding based on applying a repulsion term away from a set of predator vectors comprising a predator vector that is based on a lowest-fitness candidate prompt in the set of candidate prompts;
  - generate a set of edited prompts from the given candidate prompt using discrete textual edits;
  - select, as an updated candidate prompt for the given candidate prompt, an edited prompt from the set of edited prompts based on the target embedding; and
  - generate an output using the language processing machine learning model based on the updated candidate prompt.

2. The system of claim 1 wherein the instructions, when executed by the one or more processors, further cause the system to identify, from the set of candidate prompts, a highest-fitness candidate prompt based on the corresponding fitness scores of the set of candidate prompts, wherein the computing of the target embedding for the given candidate prompt is further based on applying an attraction term towards an embedding of the highest-fitness candidate prompt.

3. The system of claim 2, wherein the instructions, when executed by the one or more processors, further cause the system to update, based on the corresponding fitness scores, a prey-quality variable representing an aggregate quality of the set of candidate prompts and a predator-pressure variable representing an aggregate pressure imposed by the set of predator vectors.

4. The system of claim 3, wherein the instructions, when executed by the one or more processors, further cause the system to:
- update the prey-quality variable by increasing the prey-quality variable by an amount that scales with a current value of the prey-quality variable and decreases as the predator-pressure variable increases; and
- update the predator-pressure variable by increasing the predator-pressure variable by an amount that scales with a current value of the predator-pressure variable and increases as the prey-quality variable increases, wherein the prey-quality variable or the predator-pressure variable is used to determine at least one of:
  - a strength of the attraction term toward the embedding of the highest-fitness candidate prompt;
  - a strength of the repulsion term away from the set of predator vectors; or
  - a magnitude of stochastic exploration used when computing the target embedding.

5. The system of claim 1, wherein the computing of the target embedding further comprises computing a stochastic exploration term sampled from a multivariate Gaussian distribution.

6. The system of claim 1, wherein the computing of the target embedding further comprises computing, as the repulsion term, a sum over the set of predator vectors of direction vectors from respective predator vectors to an embedding of the given candidate prompt, each direction vector being normalized by a squared distance term plus an $\epsilon$ term.

7. The system of claim 1, wherein the instructions, when executed by the one or more processors, further cause the system to update at least one predator vector in the set of predator vectors by moving the at least one predator vector within an embedding space toward a centroid of a neighborhood of prompt embeddings, and by adding stochastic movement noise to the at least one predator vector.

8. The system of claim 7 wherein the instructions, when executed by the one or more processors, further cause the system to determine the neighborhood by identifying prompt embeddings that are within a distance threshold of the at least one predator vector in the embedding space or that are among a configured number of nearest prompt embeddings to the at least one predator vector.

9. The system of claim 1, wherein the generating of the set of edited prompts comprises generating at least one of: a rephrased prompt, a prompt with one or more substituted words, a prompt with a modified ordering of instructions, or a prompt with an updated template parameter value.

10. The system of claim 1, wherein the evaluating the task outputs comprises computing an accuracy score over a task dataset by comparing the task outputs to reference outputs and aggregating the accuracy score across examples in the task dataset.

11. The system of claim 1, wherein the instructions, when executed by the one or more processors, further cause the system to:

identify, from the set of candidate prompts, the lowest-fitness candidate prompt based on the corresponding fitness scores of the set of candidate prompts;

derive the predator vector from a prompt embedding of the lowest-fitness candidate prompt; and inject the predator vector into the set of predator vectors.

12. The system of claim 11, wherein the injecting of the predator vector comprises adding a noise vector to the prompt embedding of the lowest-fitness candidate prompt.

13. A method for machine learning model prompt optimization, comprising:

generating, for each candidate prompt in a set of candidate prompts, a corresponding fitness score based on using a language processing machine learning model conditioned on the candidate prompt to produce task outputs and evaluating the task outputs;

computing, for a given candidate prompt in the set of candidate prompts, based on the corresponding fitness scores of the set of candidate prompts, a target embedding based on applying a repulsion term away from a set of predator vectors comprising a predator vector that is based on a lowest-fitness candidate prompt in the set of candidate prompts;

generating a set of edited prompts from the given candidate prompt using discrete textual edits;

selecting, as an updated candidate prompt for the given candidate prompt, an edited prompt from the set of edited prompts based on the target embedding; and generating an output using the language processing machine learning model based on the updated candidate prompt.

14. The method of claim 13, further comprising identifying, from the set of candidate prompts, a highest-fitness candidate prompt based on the corresponding fitness scores of the set of candidate prompts, wherein the computing of the target embedding for the given candidate prompt is further based on applying an attraction term towards an embedding of the highest-fitness candidate prompt.

15. The method of claim 14, further comprising updating, based on the corresponding fitness scores, a prey-quality variable representing an aggregate quality of the set of candidate prompts and a predator-pressure variable representing an aggregate pressure imposed by the set of predator vectors.

16. The method of claim 15, further comprising:

updating the prey-quality variable by increasing the prey-quality variable by an amount that scales with a current value of the prey-quality variable and decreases as the predator-pressure variable increases; and updating the predator-pressure variable by increasing the predator-pressure variable by an amount that scales with a current value of the predator-pressure variable and increases as the prey-quality variable increases, wherein the prey-quality variable or the predator-pressure variable is used to determine at least one of:

a strength of the attraction term toward the embedding of the highest-fitness candidate prompt;

a strength of the repulsion term away from the set of predator vectors; or a magnitude of stochastic exploration used when computing the target embedding.

17. The method of claim 13, wherein the computing of the target embedding further comprises computing a stochastic exploration term sampled from a multivariate Gaussian distribution.

18. The method of claim 13, wherein the computing of the target embedding further comprises computing, as the repulsion term, a sum over the set of predator vectors of direction vectors from respective predator vectors to an embedding of the given candidate prompt, each direction vector being normalized by a squared distance term plus an $\epsilon$ term.

19. The method of claim 13, further comprising updating at least one predator vector in the set of predator vectors by moving the at least one predator vector within an embedding space toward a centroid of a neighborhood of prompt embeddings, and by adding stochastic movement noise to the at least one predator vector.

20. A non-transitory computer readable medium comprising instructions that, when executed by one or more processors of a computing system, cause the computing system to:

generate, for each candidate prompt in a set of candidate prompts, a corresponding fitness score based on using a language processing machine learning model conditioned on the candidate prompt to produce task outputs and evaluating the task outputs;

compute, for a given candidate prompt in the set of candidate prompts, based on the corresponding fitness scores of the set of candidate prompts, a target embedding based on applying a repulsion term away from a set of predator vectors comprising a predator vector that is based on a lowest-fitness candidate prompt in the set of candidate prompts;

generate a set of edited prompts from the given candidate prompt using discrete textual edits;

select, as an updated candidate prompt for the given candidate prompt, an edited prompt from the set of edited prompts based on the target embedding; and generate an output using the language processing machine learning model based on the updated candidate prompt.

* * * * *